UNITED STATES PATENT OFFICE.

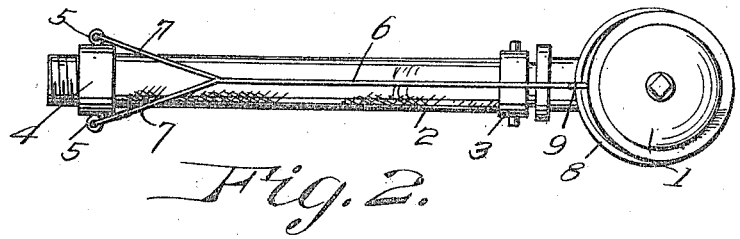
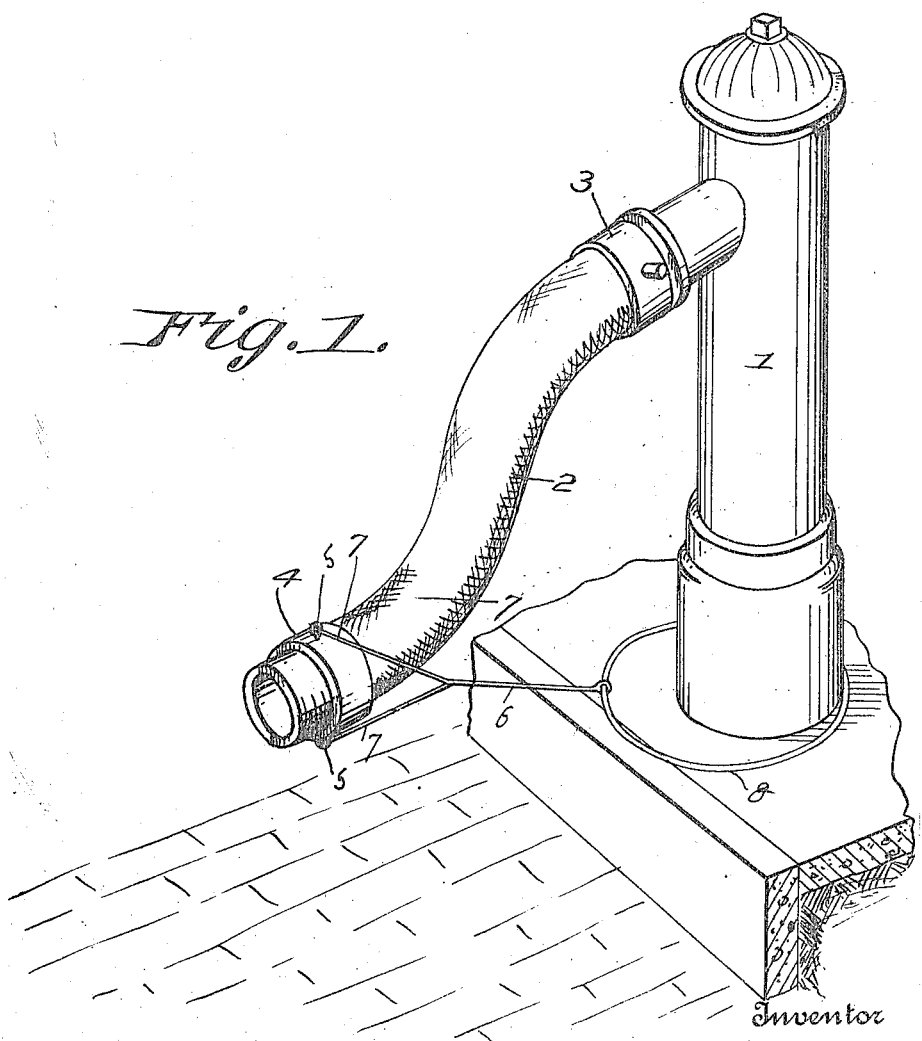

GEORGE H. WEBB, OF SKOWHEGAN, MAINE.

HOSE-ATTACHING DEVICE.

1,145,532. Specification of Letters Patent. Patented July 6, 1915.

Application filed September 25, 1914. Serial No. 863,484.

*To all whom it may concern:*

Be it known that I, GEORGE H. WEBB, a citizen of the United States, residing at Skowhegan, in the county of Somerset and State of Maine, have invented certain new and useful Improvements in Hose-Attaching Devices, of which the following is a specification.

This invention relates to hose attaching devices.

Difficulty has been experienced in connecting a line of hose to a hydrant while the hose was being laid from the hose cart. I have found from actual experience that after the connection was made there was danger that the hose might be drawn at such an angle as to retard or entirely cut off the flow of water at the hydrant.

The primary object of this invention is to provide means whereby this difficulty is obviated and to enable one man to make the coupling at the hydrant and at the same time insure slack enough in the hose so that it will not be drawn at an angle so as to cut off the flow of water from the hydrant to such hose.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a perspective view showing the application of the invention. Fig. 2 is a top plan of Fig. 1.

Like numerals of reference indicate like parts in the different views.

Referring to the drawings, 1 designates a hydrant of any well known or approved form of construction.

2 designates a piece of hose provided at one end with a coupling 3 for attachment to a hydrant in the well known way. The other end of the hose section 2 is provided with a coupling 4 to receive the next length of hose and this coupling is provided with projections 5 which, in the present instance, are shown as in the form of eyelets.

6 is a rope, strap, chain or other ligament, shown as branched at one end, as at 7, and these branches are connected in any suitable manner with the projections 5, as seen best in Fig. 2. The other end of the ligament 6 has connected therewith, in any suitable manner, a ring 8. In the present instance, the end of the ligament is shown as provided or formed with an eye or the like 9, through which this ring is loosely passed so as to be movable therein, but other forms of connection between the ring and ligament may be employed.

The mode of use will be apparent. The coupling 4 is attached to the end of the hose section 2 ready for use. The operator throws the ring 8 over the hydrant, as shown. This takes care of the strain incident to the laying of the hose, it being understood that the ligament 6 is of such length as to give a sufficient slack in the hose section 2 to enable the connection to be readily made at the hydrant and to insure the ready flow of water.

Modifications in detail may be resorted to without departing from the spirit of the invention or sacrificing any of its advantages.

What is claimed as new is:—

1. A fire hose attachment comprising a ligament for connection at one end with a hose and at the other end provided with means at a distance from the attaching end of the hose for attachment to a hydrant, said attachment serving to restrain the hose during the usual coupling operation.

2. A fire hose attaching means comprising a ligament for attachment to the hose at a distance from its attaching end, and a ring connected with said ligament for engagement with a hydrant, said device serving to restrain the hose during the usual coupling operation.

3. In a device for the purpose described, a coupling having projecting means and attachable to a fire hose at a distance from the coupling end of the latter, a ligament connected at one end to said means, and a ring carried by the other end of said ligament for engagement with a hydrant, the whole serving to restrain the hose during the usual coupling operation.

4. In a device for the purpose described, a fire hose engaging member provided with lateral projections, a ligament having a branched end for connection with said projections, and a ring connected with the other end of said ligament engageable over a hydrant and engageable therewith near the ground, the whole serving to restrain the hose during the usual coupling operation.

5. In a device for the purpose described, a fire hose engaging member provided with lateral projections, a ligament having a branched end for connection with said projections, and a ring connected with the other end of said ligament and engageable over a hydrant near the ground, said ring being slidably connected with said ligament and the whole serving to restrain the hose during the usual coupling operation.

In testimony whereof I affix my signature in presence of two witnesses.

GEORGE H. WEBB.

Witnesses:
AMOS K. BUTLER,
ERNEST C. BUTLER.